Jan. 28, 1964     A. A. TALLQUIST     3,119,499
OVERHEAD LATHE CHARGER
Filed May 8, 1961     3 Sheets-Sheet 1
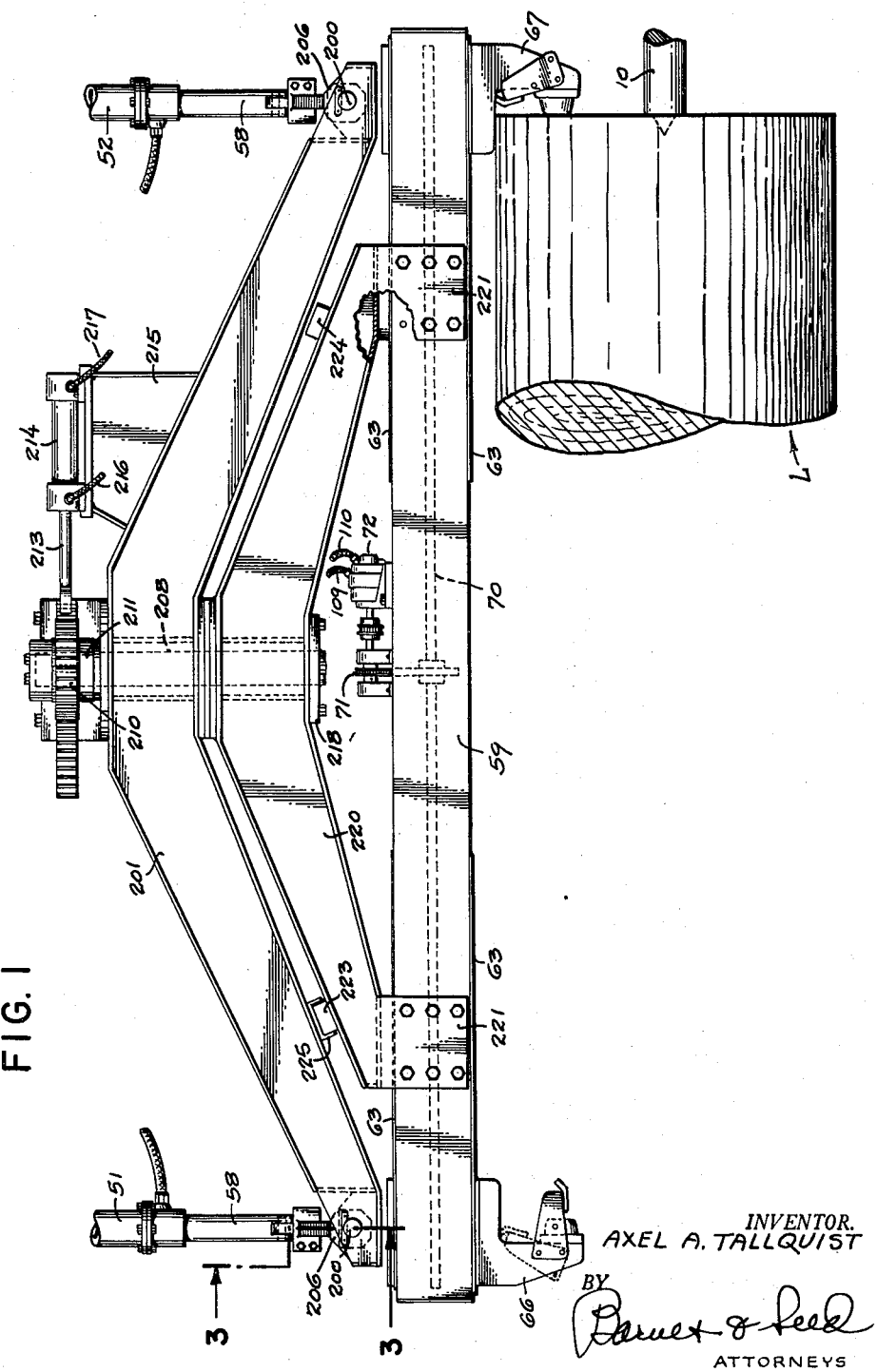
FIG. I
INVENTOR.
AXEL A. TALLQUIST
BY
ATTORNEYS Jan. 28, 1964 A. A. TALLQUIST 3,119,499
OVERHEAD LATHE CHARGER
Filed May 8, 1961 3 Sheets-Sheet 2

INVENTOR.
AXEL A. TALLQUIST
BY
*Barnet & Lee*
ATTORNEYS

Jan. 28, 1964 A. A. TALLQUIST 3,119,499
OVERHEAD LATHE CHARGER
Filed May 8, 1961 3 Sheets-Sheet 3

INVENTOR.
AXEL A. TALLQUIST
BY
Seed & Berry

United States Patent Office 3,119,499
Patented Jan. 28, 1964

3,119,499
OVERHEAD LATHE CHARGER
Axel A. Tallquist, Seattle, Wash., assignor to Ederer Corporation, Seattle, Wash., a corporation of Washington
Filed May 8, 1961, Ser. No. 108,574
19 Claims. (Cl. 212—11)

This invention relates to an overhead lathe charger, particularly a charger for delivering log blocks to the chucks of a peeler lathe, and for its principal object aims to provide apparatus by which log blocks which have been brought between the chucks of a peeler lathe may be turned end for end where it is ascertained that the log block is facing in a direction less advantageous, for peeling, than would be the case if the spirality of the peeler knife's cut were to develop in the opposite direction. The desirability of so turning a peeler block may instantly evidence itself to an experienced lathe operator when the peeler block is delivered between the lathe chucks preparatory to peeling, or it may be apparent only as the peeling operation proceeds. A cut working in one direction may inherently develop a rough surface while an oppositely-directed cut will be very smooth. Also of governing importance in determining the direction in which a peeler knife cuts around the perimeter of a log block are cracks in the block. Peeled in one direction the knife will pass freely over the crack while in the other direction there is a tendency to dig into the crack.

With the above object in mind, and further aiming to provide a rugged apparatus of comparatively simple construction which permits a log block to be turned end for end with ease and expedition and without disturbing a pre-centered setting given to the block, the invention consists in the novel construction and in the adaptation and combination of parts hereinafter described and claimed.

In the accompanying drawings:

FIGURE 1 is a fragmentary front elevational view illustrating that portion of an overhead lathe charger which embodies the teachings of the present invention.

Figure 3:
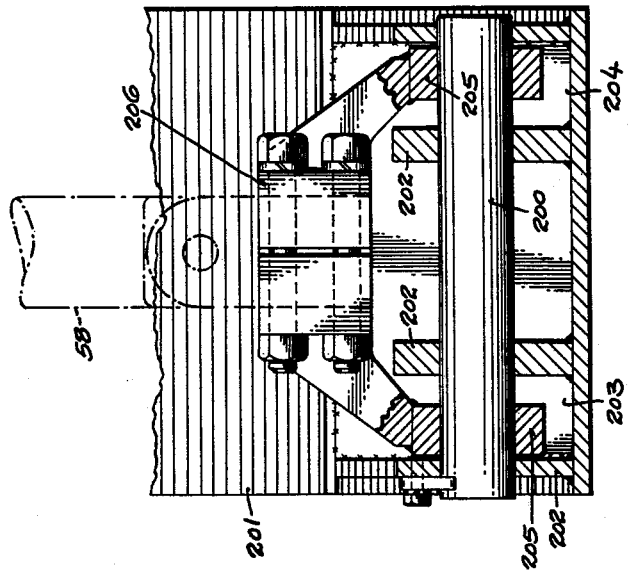
Figure 2:
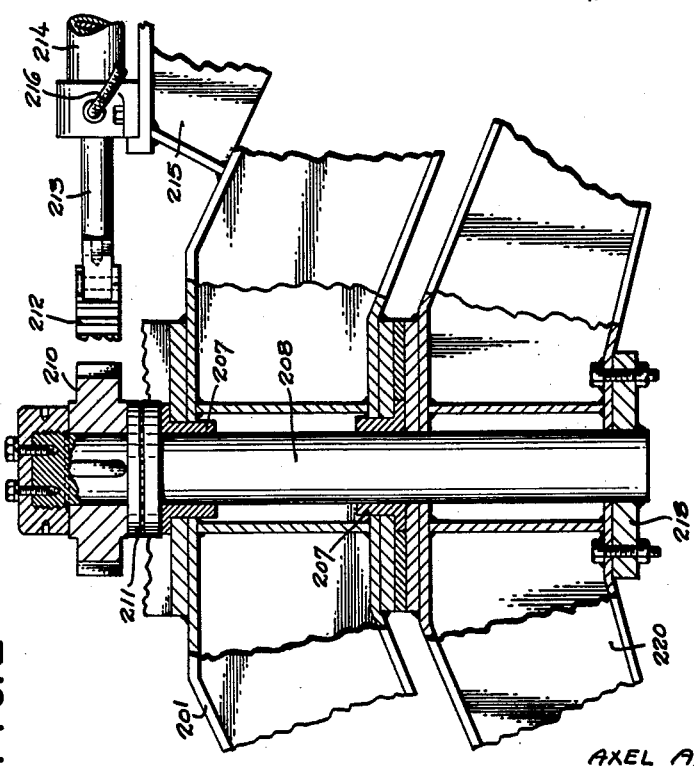
FIG. 2 is a fragmentary vertical sectional detail-view thereof drawn to an enlarged scale.
Figure 4:
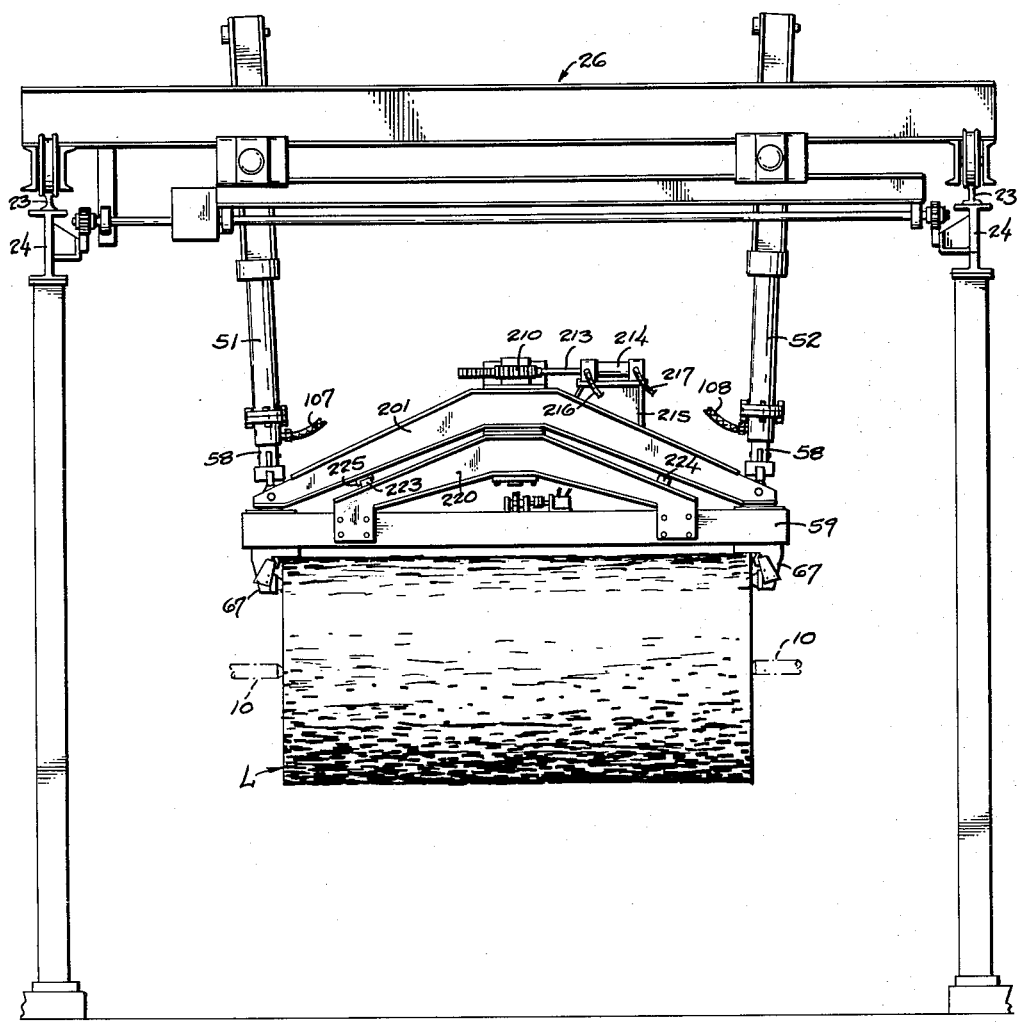

FIG. 3 is a fragmentary transverse vertical sectional view drawn to a yet larger scale on line 3—3 of FIG. 1; and FIG. 4 is a reduced-scale front elevational view illustrating the structure of the present invention in its functioning relationship with an associated carriage which serves to convey the peeler log block from a landing stage to the chucks of the peeler lathe, the view being fragmentary in its illustration of hydraulic hoses.

A preferred procedure in charging peeler blocks, designated in said drawings by the letter L, to the chucks 10 of a peeler lathe is clearly illustrated and described in Bulletin No. V-104 published January, 1952 by Ederer Engineering Co., Seattle, Washington, and in pending patent application of Bernard A. Pearson, Ser. No. 607,785, filed Sept. 4, 1956, now Patent No. 3,088,505, and may be here cursorily traced as follows:

The peeler log block L is conveyed to a landing stage located remote to the lathe, where it occupies a position more or less parallel with the axis of the lathe chucks 10. Above the landing stage is a crane carriage 26 movable horizontally on twin overhead rails between a position above the landing stage and a position above the lathe. Beams 24 give support to said rails A grapple-beam 59 is suspended from the carriage to extend transversely of the landing stage and has means 66 and 67 depending from its two ends which grip the two ends of the peeler block so that the latter extends endwise to the grapple-beam below the latter. The gripping means are arranged to be shifted in concert inwardly and outwardly endwise to the beam in order to adapt the gripping means to peeler blocks of different lengths. The suspension for said grapple-beam comprises, for each end thereof, a respective wrist-connected piston rod 58 the piston principal of which works in a vertically disposed hydraulic cylinder, as 51 and 52. This enables a gripped log block to be raised off the landing and the two ends of such raised block adjusted independently in a vertical direction. The cylinders of said cylinder-and-piston assemblies each pivot freely about a horizontal axis lying transverse to the crane's travel path, and each said cylinder admits to a controlled limited bodily shifting motion endwise to said travel path.

The described adjustments enable the peeler block to be pre-centered such as to locate a given axis of the block parallel to the axial line of the lathe chucks and spaced therefrom a distance corresponding to the established distance travelled by the crane as the latter is moved between its two end limits of travel, namely from a position above the landing stage to a position above the peeler lathe. Arriving in the latter position the peeler log occupies a position between the lathe chucks with said given axis of the block coinciding with the rotary axis of said chucks, whereupon the chucks are advanced to grip the log, the gripping jaws of the charger disengaged, and the lathe is turned to initiate a spiral peeling of the block.

It is to be here understood that the present invention, while having been particularly designed for use in turning end-for-end a peeler block which has been pre-centered by equipment of the type here described, is in no sense limited thereto. The teachings of the invention perforce lend themselves to employment with any lathe-charging equipment in that the need to turn peeler blocks is many times apparent only to the lathe operator and then only after the peeling operation has been initiated.

In order to correlate structure of the present invention to functional counterparts in the apparatus of the above-identified patent application, corresponding reference characters have been applied to such of the above-described parts as have been shown in the present drawings.

While not here detailed, the grapple-beam is comprised of two spaced-apart channel members having their troughs facing inwardly. Exposed slippers 63 are applied as facing to the upper and lower flanges of said channel members. The grapple blocks lie in the space between the channel members and receive a slide journal from the slippers. Each block carries a threaded traveller nut, the one right hand and the other left hand, and a worm screw 70 chain-driven from a reversing hydraulic motor 72 engages these nuts so that the two grapple blocks may be shifted inwardly and outwardly in unison. 109 and 110 designate the hydraulic hoses for said motor, and 71 the chain drive to the worm screw.

According to the present invention the piston rods 58, rather than being attached directly to the grapple beam as in the arrangement of the above-identified Pearson invention, are attached by wrist pins 200 to the opposite ends of a head yoke 201 arranged in its normal position to closely overlie the grapple-beam in a transverse vertical plane common thereto. Said yoke is or may be a fabricated member of box section configuration and at each of its two ends presents a respective open-top chamber divided by ribs 202 into two spaced stalls 203 and 204.

A fork 206 fixed upon the lower end of a related one of the two piston rods 58 has its two arms 205 received in said stalls, with the related wrist pin 200 connecting said fork arms to the ribs. The yoke 201 has a central vertically bored hub bushed, as at 207, for the journal mounting of a king pin 208. Such king pin projects both by its upper and lower ends beyond said hub. The upper of these projecting ends has a pinion 210 fixed thereto, and between the pinion and the bushing there is provided a friction-free thrust bearing 211. Meshing the pinion is a rack 212. This rack is fixedly secured upon the exposed end of a piston rod 213. The piston for such rod works in a double-acting oil cylinder 214 carried by a bracket 215 which is rigid with the yoke. 216 and 217 represent the hydraulic lines which connect the two ends of the cylinder with a control valve, enabling oil to be charged from a pressure source of supply to either of said hydraulic lines, selectively, while the other line dumps to a supply reservoir.

The lower end of said king pin 208 is rigidly secured by means of a foot-plate 218 to the hub of a subjacent hanger yoke 220. Yoke 220, like the yoke 201, is or may be a fabricated member of box section configuration and has its hub vertically bored to accommodate the king pin. The hanger yoke surmounts the grapple-beam in a vertical plane common thereto and at the extremities of its two arms presents depending skirts 221 which flank the side faces of the grapple-beam and are bolted or otherwise rigidly secured thereto.

As will, it is believed, be clearly understood, endwise motion given to the piston principle of the piston rod 213 acts through the rack 212 to turn the pinion 210. By means of the connecting king pin, the hanger yoke 220 and its subjacent co-planar grapple-beam 59 swing relative to the head yoke 201 about the center of said king pin as an axis. The swing motion is limited to a 180° turn by means of stops 223 and 224 fixed to the upper face of the hanger yoke and engaged by a lug 225 fixed to the underside of the head yoke. The latter occupies a position on substantially the longitudinal median line of the head yoke so that its opposite faces are spaced equidistantly on opposite sides of said median line. The stops 223 and 224 are so located that the face thereof engaged by the lug is spaced beyond the longitudinal median line of the hanger yoke a distance corresponding to half the width of the lug, thus placing the two yokes in a co-planar relationship at each of the two extremes of swing motion.

No limitations are implied by reason of having particularly described my now-preferred illustrated embodiment. Changes in the details of construction can be resorted to without departing from the spirit of the invention. It is my intention that the hereto annexed claims be given the broadest interpretation to which the employed language fairly admits.

What I claim is:

1. In an apparatus for charging log blocks to a lathe and having an overhead carriage mounted for movement from a pick-up station to a delivery station, hydraulic piston-and-cylinder assemblies depending from opposite sides of the carriage, a head yoke extending between said piston-and-cylinder assemblies, wrist pins connecting each of the two ends of the head yoke with a related one of the piston-and-cylinder assemblies to permit said ends to be raised and lowered independently by telescoping action of the piston-and-cylinder assemblies, a hanger yoke structure underlying the head yoke in centered relation thereto, a king pin connecting said yokes to allow the hanger yoke to swivel relative to the head yoke about a vertical axis lying midway between the ends of the yokes, power means including a hydraulic piston-and-cylinder assembly for swinging the hanger yoke relative to the head yoke about said swivel axis, stops limiting said swing motion to an exact 180° arc, a respective means on each of the two ends of the hanger yoke structure arranged to grip a long block therebetween and mounted for shift motion endwise to the yoke structure as an adaptation to log blocks of differing lengths, and power means for shifting said gripping means.

2. In combination with an overhead lathe charger of the described character having a crane carriage mounted for reciprocal movement along a travel path the two limits of which overlie a landing stage at one end and a horizontal lathe at the other end, and having a respective hanger suspended from each of the two sides of said carriage and each admitting to independent motion both in a vertical direction and also horizontally in the direction of the crane's movement, a cross-member having its two ends suspended one by one and the other by the other of said hangers, a yoke suspended from said cross-member and mounted for swivelling motion relative thereto about a vertical axis located intermediate its ends and central to the length of the cross-member, means for releasably setting said yoke in either of two positions turned 180° to one another, and means on the two ends of the yoke for releasably gripping the ends of a log block.

3. In combination with an overhead lathe charger of the described character having a crane carriage mounted for reciprocal movement along a travel path the two limits of which overlie a landing stage at one end and a horizontal lathe at the other end, and having a respective hanger suspended from each of the two sides of said carriage and each admitting to independent motion both in a vertical direction and also horizontally in the direction of the crane's movement, a cross-member having its two ends suspended one by one and the other by the other of said hangers, a yoke suspended from said cross-member and mounted for swivelling motion relative thereto about a vertical axis located intermediate its ends and central to the length of the cross-member, means for releasably setting said yoke in either of two positions both co-planar with the cross-member and turned 180° to one another, and means on the two ends of the yoke for releasably gripping the ends of a log block.

4. In combination with an overhead lathe charger of the described character having a crane carriage mounted for reciprocal movement along a travel path the two limits of which overlie a landing stage at one end and a horizontal lathe at the other end, and having a respective hanger suspended from each of the two sides of said carriage and each admitting to independent motion both in a vertical direction and also horizontally in the direction of the crane's movement, a cross-member having its two ends suspended one by one and the other by the other of said hangers, a yoke suspended from said cross-member and mounted for swivelling motion relative thereto about about a vertical axis located intermediate its ends and central to the length of the cross-member, power means for turning said yoke between two limits of swivel motion disposed 180° from one another, and means on the yoke for supporting a log block.

5. Structure according to claim 4 in which the power means comprises a rack-and-pinion with the rack reciprocally driven by a piston working in a hydraulic cylinder.

6. In combination with a carriage mounted for horizontal movement in a linear path, a horizontal cross-member extending transverse to the carriage, means connecting said cross-member to the carriage for independent movement of each of its ends relative to the carriage in a vertical direction and also horizontally in the general direction of said linear path, a horizontal load supporting member, means connecting said load supporting member to the cross-member so as to underlie the latter and swivel relative thereto about a vertical axis, and means for swinging said load supporting member about said swivel axis through a swing arc of exactly 180°.

7. The combination of claim 6 in which the load supporting member provides means at its two ends for gripping a load therebetween, and means for shifting said gripping means toward and from one another.

8. Structure according to claim 7 in which the means for swinging the load supporting member and the means for shifting the gripping means are each hydraulically powered.

9. In combination with a carriage mounted for horizontal movement between two stations, a member carrying load engaging means at its two ends each arranged to support a respective one of the two ends of a log block, means connecting said member to the carriage for such movement thereof as will raise and lower the load engaging means independently and also skew the load engaging means independently in a direction which is generally normal to a line projected between the two load engaging means, said connecting means also permitting the member to be swung end for end relative to the carriage through an exact 180° arc about a vertical swivel axis, and power means for imposing upon said member said several movements to which the same admits.

10. Structure according to claim 9 in which said power means includes devices operated by pressure fluid.

11. An overhead support arranged to be set in a position localized with respect to a subjacent peeler lathe, a member providing means arranged to be releasably secured to a log block so as to sustain the same, interchangeably and free of any interference with the chucks of said lathe, and carried by said overhead support for swivel motion about a vertical axis located central to the length of the sustained log, means prescribing for said swivel-mounted member an exact 180° arc through which the member can turn in its said swivel motion so as to permit the log to be swung end for end at will without otherwise disturbing the existing relationship between the log and the lathe, and means for releasably setting said swivel-mounted member at either end limit of said prescribed 180° arc of turn.

12. An overhead support arranged to be set in a position localized with respect to a subjacent peeler lathe, a horizontal beam structure carried by said support for swivel motion relative thereto about a vertical axis located central to the length of the beam structure and at its two ends providing means arranged to be releasably secured to a respective one of the two ends of a log block so as to sustain the log block, free of any interference and interchangeably with the chucks of the lathe, means prescribing for said beam structure an exact 180° arc through which the same can turn in its said swivel motion so as to permit the log to be swung end for end at will without otherwise disturbing the existing relationship between the log and the lathe, and power means for moving the beam structure to either end limit of said prescribed 180° arc of turn.

13. The structure of claim 12 in which the power means comprises a rack and pinion with the rack reciprocally driven by a piston working in a pressure-fluid cylinder.

14. The structure of claim 12 in which means are provided for shifting the block-securing means endwise to the beam structure toward and from one another as an adaptation to log blocks of differing lengths.

15. Structure according to claim 14 in which the means for shifting the block-securing means is power-driven and includes a device operated by pressure fluid.

16. Structure according to claim 12 in which the beam structure comprises a beam proper carrying the log-securing means and rigidly secured to an overlying yoke so as to hang from the latter, the overhead support comprising a head yoke overlying the hanger yoke with its yoke arms spaced above and normally occupying approximately the same vertical plane as that occupied by the arms of the hanger yoke, the swivel mounting comprising a king pin connecting central portions of the two yokes.

17. Structure according to claim 16 in which the means which prescribes said exact 180° arc comprises two stops each fixed to a respective one of the two arms of one of the yokes in the swing path travelled by a lug fixed to one of the two arms of the other yoke.

18. Structure according to claim 16 in which the power means surmounts the head yoke.

19. Structure according to claim 16, power means being provided for shifting the log-securing means endwise to the beam directively toward and from one another as an adaptation to log blocks of differing lengths, said power means overlying the beam in a guarded space provided by the bowed shape of the hanger yoke.

References Cited in the file of this patent

UNITED STATES PATENTS

| | | |
|---|---|---|
| 2,718,320 | Nelson et al. | Sept. 20, 1955 |
| 2,872,050 | Norwood | Feb. 3, 1959 |